(12) United States Patent
Zhou et al.

(10) Patent No.: US 9,953,102 B2
(45) Date of Patent: Apr. 24, 2018

(54) CREATING NOSQL DATABASE INDEX FOR SEMI-STRUCTURED DATA

(71) Applicant: Alibaba Group Holding Limited, Grand Cayman (KY)

(72) Inventors: Qi Zhou, Hangzhou (CN); Tingtao Sun, Hangzhou (CN); Hua Cai, Hangzhou (CN); Hao Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 400 days.

(21) Appl. No.: 14/599,296

(22) Filed: Jan. 16, 2015

(65) Prior Publication Data

US 2015/0205885 A1    Jul. 23, 2015

(30) Foreign Application Priority Data

Jan. 20, 2014  (CN) .......................... 2014 1 0025080

(51) Int. Cl.
    *G06F 17/30*    (2006.01)

(52) U.S. Cl.
    CPC .. *G06F 17/30911* (2013.01); *G06F 17/30339* (2013.01); *G06F 17/30622* (2013.01)

(58) Field of Classification Search
    None
    See application file for complete search history.

(56) References Cited

U.S. PATENT DOCUMENTS

| | | |
|---|---|---|
| 6,591,272 B1 | 7/2003 | Williams |
| 8,566,324 B1 | 10/2013 | Sacco |
| 2011/0055192 A1* | 3/2011 | Tang ................ G06F 17/30684 707/706 |
| 2013/0085999 A1 | 4/2013 | Tung et al. |
| 2013/0124545 A1 | 5/2013 | Holmberg et al. |
| 2013/0226971 A1 | 8/2013 | Shoolman et al. |
| 2013/0339293 A1 | 12/2013 | Witten |
| 2013/0339366 A1 | 12/2013 | Khimich et al. |
| 2014/0108415 A1 | 4/2014 | Bulkowski |
| 2014/0149400 A1 | 5/2014 | Fu et al. |
| 2014/0172833 A1 | 6/2014 | Taylor |

OTHER PUBLICATIONS

PCT Search Report and Written Opinion dated Apr. 16, 2015 for PCT Application No. PCT/US15/11844, 15 Pages.

* cited by examiner

*Primary Examiner* — Belix M Ortiz Ditren
(74) *Attorney, Agent, or Firm* — Lee & Hayes, PLLC (57) ABSTRACT

Semi-structured source data is preprocessed to obtain text partitions to be stored into a data table with a first combined primary key including a structure thread primary key and a sequence value primary key. The structure thread primary key identifies a structure thread that is segmented into several consecutive intervals according to a determined or predetermined sequence. An inverted index table, created for the preprocessed text partitions, includes a second combined primary key including the structure thread primary key and a keyword primary key. Corresponding to values of the primary keys in the second combined primary key, related text partition sequence IDs are recorded as index values of the inverted index table. Index values having a same keyword primary key value but different structure thread primary key values are located in different rows in the inverted index table. The present techniques improve query efficiency of database index and facilitate updating.

20 Claims, 2 Drawing Sheets

CREATING NOSQL DATABASE INDEX FOR SEMI-STRUCTURED DATA

CROSS REFERENCE TO RELATED PATENT APPLICATION

This application claims foreign priority to Chinese Patent Application No. 201410025080.6 filed on 20 Jan. 2014, entitled "METHOD AND APPARATUS FOR CREATING NoSQL DATABASE INDEX FOR SEMI-STRUCTURED DATA," which is hereby incorporated by reference in its entirety.

TECHNICAL FIELD

The present disclosure relates to the field of computer application technologies, and more particularly, to a method and an apparatus for creating a NoSQL database index for semi-structured data.

BACKGROUND

A database management system is a means for manipulating and managing databases, and is used for creating, using, and maintaining databases. It manages and controls databases in a unified manner so as to ensure the security and integrity of the databases.

With the arising of the big data era, transactions and interactive data are also increasing rapidly. Terabyte (TB)-level data processing has become a basic configuration. Data types also transition from a single type to diversified types, such as structured data, unstructured data, and semi-structured data. The structured data generally refers to data information such as Enterprise Resource Planning (ERP) data and financial system data of enterprises. The unstructured data refers to data such as audios, pictures, and videos. The semi-structured data refers to self-describing data that has an implicit but not rigorous structure, such as e-mails, Hypertext Markup Language (HTML), reports, and repositories.

Conventional relational database management systems have some limitations when used for processing the aforementioned large-scale and diversified data, and are especially incompetent when used for processing unstructured data and semi-structured data. Therefore, the concept of NoSQL arises.

A NoSQL refers to a non-relational database or a database for storage of unstructured data. Column-type storage (such as Hbase and OTS) in the NoSQL storage is a column-based database to facilitate reading and writing big data content. A NoSQL storage model may be expressed in a form of a table. Each table includes multiple rows and each row is divided into multiple columns. When the table is created, a primary key column needs to be specified for the rows. The primary key column is usually used to group data, and rows of adjacent primary keys are usually organized together. A manner of querying a NoSQL database is to create an index for the NoSQL database.

An index is a structure that sorts values of one or more columns in a database table, and by using the index, a user can quickly access specific information in the database table. Therefore, required information may be found by creating an index for a database.

An Inverted index is one of the most commonly used data structures in NoSQL databases. The inverted index allows a user to search for a record according to an attribute value, and each item in an inverted index table includes an attribute value and locations of the records having this attribute value. As the records do not determine the attribute value, the attribute value is used to determine the locations of the records. Thus, the data structure is referred to as the inverted index. Using a common NoSQL database type, namely a document retrieval system as an example, if an inverted index needs to be created for document files stored on a hard disk, the attribute values are keywords in the documents. Each corresponding keyword record in the inverted index table includes a hard disk storage location where a document file that includes the keyword locates, and the hard disk storage location is called the index value.

Using the aforementioned document retrieval system as an example, when a database index needs to be created for a large quantity of documents, the documents and index may be stored in a data table of a NoSQL database and an inverted index table. A primary key of the data table is a document ID, and a value of the data table is a document content. A primary key of the inverted index table is a keyword, and a value of the inverted index table is a list of documents that include the keyword. By using the keyword primary key of the inverted index table, a user may search for document IDs of all documents that include the keyword, and then by searching the data table according to these document IDs, the user may find corresponding document contents. The aforementioned method achieves quick retrieval of information needed by a user from massive amounts of data, and achieves the purpose of creating an index for a NoSQL database.

However, the existing inverted index created based on NoSQL for data has low query efficiency because, when a user performs a query according to a keyword, the entire inverted index table needs to be searched to find the corresponding keyword, and time spent on the search increases exponentially with the amount of data, which leads to a low query efficiency.

In addition, an updating efficiency of the existing NoSQL database index is excessively low. Using the aforementioned document retrieval system as an example, in an existing NoSQL system, when data of a new document is added, first, the original inverted index table needs to be searched to find locations of keywords of the new document in the inverted index table, and then a document ID of the new document corresponding to these keywords is written into the inverted index table. As content of the inverted index table needs to be read first, which significantly lowers an updating speed of the database index, when the database is very large, the updating speed will be unacceptable.

As the manner of creating an index based on NoSQL storage data in the existing techniques has the problems of low query efficiency and low update efficiency, the system has low throughput, and is incapable of processing writing and query for TB-sized documents.

Therefore, to create a NoSQL database index having a higher throughput capability has become an urgent technical problem to be solved.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides an example method for creating a NoSQL database index for semi-structured data, and the database index has high query efficiency and is easy to update.

The present disclosure also provides an example apparatus for creating a NoSQL database index for semi-structured data.

To solve the aforementioned technical problems, the present disclosure provides an example method for creating a NoSQL database index for semi-structured data. Semi-structured source data is preprocessed to obtain text partitions to be stored into a database. The preprocessed text partitions are stored into a data table. The data table includes a first combined primary key, and each text partition corresponding to the first combined primary key is stored into a corresponding record. The first combined primary key includes a structure thread primary key and a sequence value primary key. The structure thread primary key identifies a structure thread, and the structure thread is segmented into several consecutive intervals according to a determined or predetermined sequence. A specific key value is assigned to each interval to serve as a value of the structure thread primary key. The sequence value primary key assigns, to each text partition, a sequence value uniquely corresponding to the text partition. An inverted index table is created for the preprocessed text partitions, where a primary key of the inverted index table is a second combined primary key. The second combined primary key includes the structure thread primary key and a keyword primary key. In the inverted index table, corresponding to key values of the primary keys, related text partition sequence IDs are recorded as index values. Index values having a same keyword primary key value but different structure thread primary key values are located in different rows in the inverted index table.

For example, the first combined primary key includes a data source primary key, and the data source primary key identifies a data source of a text partition. The second combined primary key also includes the data source primary key, and index values having different data source primary key values are located in different rows in the inverted index table.

For example, when the data table and the inverted index table are created for the text partitions, all text partitions from a same data source and having a same structure thread primary key value are read in one time.

For example, in the first combined primary key, the data source primary key specifically uses hash values calculated based on the data source of the text partition and original value of the structure thread of the text partition, and/or, in the second combined primary key, the data source primary key specifically uses hash values calculated based on the data source of the text partition and keywords.

For example, the structure thread is a generation time of the source data of the text partition.

For example, the structure thread is segmented into several consecutive intervals according to a determined sequence. The generation time of the source data of the text partitions is segmented into several time periods. A specific key value is assigned to each interval to serve as a value of the structure thread primary key. A time value of a start point, an end point, a middle point of the time period, or any point in the time period is used as the specific key value. Alternatively a unique identifier is determined for the time period to serve as the specific key value.

For example, the sequence value is expressed in a form of a base value and an offset value. The base value corresponds to the value of the structure thread primary key. That is, a same structure thread primary key value corresponds to a same base value. The offset value is acquired in the following manner: according to a sequence of original values of the structure thread, a corresponding offset value is assigned sequentially to each text partition corresponding to a same structure thread primary key value.

For example, a method for recording related text partition IDs as index values in the inverted index table is as follows. A base value is provided for all text partitions that correspond to a same data source primary key value and have a same structure thread primary key value. At the same time, a binary bit array is provided for these text partitions. An $i^{th}$ binary digit in the bit array is used to indicate if an $i^{th}$ text partition includes a keyword listed in the keyword primary key of a record where the $i^{th}$ text partition is located.

For example, if all text partitions corresponding to a same data source primary key value and having a same structure thread primary key value include a given keyword, index values of records that are in the inverted index table and corresponding to the keyword primary key are recorded as a special symbol. The special symbol indicates that the text partitions include the keyword. Alternatively, if a small number of text partitions corresponding to a same data source primary key value and having a same structure thread primary key value include a given keyword, text partition offset values expressed in a form of integers are directly recorded.

The present disclosure further provides an example apparatus for creating a NoSQL database index for semi-structured data. The apparatus may include a preprocessing unit, a data table creating unit, and an inverted index table creating unit. The preprocessing unit preprocesses semi-structured source data to obtain text partitions to be stored into a database. The data table creating unit creates a data table for storing the preprocessed text partitions. The data table includes a first combined primary key, and each text partition corresponding to the first combined primary key is stored into a corresponding record. The first combined primary key includes a structure thread primary key and a sequence value primary key. The structure thread primary key identifies a structure thread, and the structure thread is segmented into several consecutive intervals according to a determined sequence. A specific key value is assigned to each interval to serve as a value of the structure thread primary key. The sequence value primary key assigns, to each text partition, a sequence value that uniquely corresponds to the text partition. The inverted index table creating unit creates an inverted index table for the preprocessed text partitions. A primary key of the inverted index table is a second combined primary key, and the second combined primary key includes the structure thread primary key and a keyword primary key. In the inverted index table, corresponding to key values of the primary keys, related text partition sequence IDs are recorded as index values. Index values having a same keyword primary key value but different structure thread primary key values are located in different rows in the inverted index table.

For example, the first combined primary key includes a data source primary key, and the data source primary key identifies a data source of a text partition. The second combined primary key also includes the data source primary key, and index values having different data source primary key values are located in different rows in the inverted index table.

For example, when the data table and the inverted index table are created for the text partitions, all text partitions from a same data source and having a same structure thread primary key value are read once.

For example, in the first combined primary key, the data source primary key specifically uses hash values calculated based on the data source of the text partition and original value of the structure thread of the text partition, and/or, in the second combined primary key, the data source primary key specifically uses hash values calculated based on the data source of the text partition and keywords.

For example, the structure thread is a generation time of the source data of the text partition.

For example, the structure thread is segmented into several consecutive intervals according to a determined sequence. The generation time of the source data of the text partitions is segmented into several time periods. A specific key value is assigned to each interval to serve as a value of the structure thread primary key. A time value of a start point, an end point, a middle point of the time period, or any point in the time period is used as the specific key value. Alternatively a unique identifier is determined for the time period to serve as the specific key value.

For example, the sequence value is expressed in a form of a base value and an offset value. The base value corresponds to the value of the structure thread primary key. That is, a same structure thread primary key value corresponds to a same base value. The offset value is acquired in the following manner: according to a sequence of original values of the structure thread, a corresponding offset value is assigned sequentially to each text partition corresponding to a same structure thread primary key value.

For example, a method for recording related text partition IDs as index values in the inverted index table is as follows. A base value is provided for all text partitions that correspond to a same data source primary key value and have a same structure thread primary key value. At the same time, a binary bit array is provided for these text partitions. An $i^{th}$ binary digit in the bit array is used to indicate if an $i^{th}$ text partition includes a keyword listed in the keyword primary key of a record where the $i^{th}$ text partition is located.

For example, if all text partitions corresponding to a same data source primary key value and having a same structure thread primary key value include a given keyword, index values of records that are in the inverted index table and corresponding to the keyword primary key are recorded as a special symbol. The special symbol indicates that the text partitions include the keyword. Alternatively, if a small number of text partitions corresponding to a same data source primary key value and having a same structure thread primary key value include a given keyword, text partition offset values expressed in a form of integers are directly recorded.

Compared with the conventional techniques, the present disclosure has the following features. The present disclosure provides an example method for creating a NoSQL database index for semi-structured data. The method first preprocesses semi-structured source data to obtain several text partitions to be stored into a database, and, by using a data source, a structure thread, and a sequence value as primary keys, stores the text partitions into rows corresponding to the primary keys to form a data table, and then, by using the data source, the structure thread, and a keyword as primary keys, records related text partition sequence IDs as index values. As an inverted index is created corresponding to the data source, the structure thread, and the keyword, during query, the data source, the structure thread, and the keyword are combined for searching. Therefore, during the query, only sequence values of text partitions that include the keyword and also correspond to the data source and the structure thread need to be parsed, which renders parsing time in direct proportion to the data amount in a given key value of the data source and the structure thread and irrelevant to the total data amount of the system. Therefore, query efficiency may be significantly improved.

In addition, in an example embodiment of the present disclosure, when the data table and the inverted index table are created for the text partitions, text partitions that come from a same data source and have a same structure thread primary key value are read once, and a data table and an inverted index table are created for these text partitions. When a data table and an inverted index table are created for a text partition that come from a different data source or has a different structure thread primary key value subsequently, it is unnecessary for the present techniques to read the original inverted index table, and a new inverted index record may be inserted directly. Therefore, after the example technique is used, it is unnecessary for the present techniques to read the original inverted index table when creating or updating the NoSQL database index. Considering that a reading operation of the inverted index table takes more time than a writing operation, the example method may effectively improve update efficiency of the database index system and improve throughput of the whole database system.

BRIEF DESCRIPTION OF THE DRAWINGS

To illustrate technical solutions in the example embodiments of the present disclosure or the conventional techniques more clearly, accompanying drawings used in the example embodiments or in the conventional techniques will be described briefly as follows. Apparently, the accompanying drawings to be described below are merely some example embodiments of the present disclosure, and one of ordinary skill in the art may obtain other drawings according to these accompanying drawings.

DETAILED DESCRIPTION

The technical solutions in the example embodiments of the present disclosure are described with reference to the accompanying drawings in the example embodiments of the present disclosure. Apparently, the described example embodiments are merely some rather than all embodiments. All other embodiments obtained by one of ordinary skill in the art based on the example embodiments in the present disclosure fall within the protection scope of the present disclosure.

Figure 1:
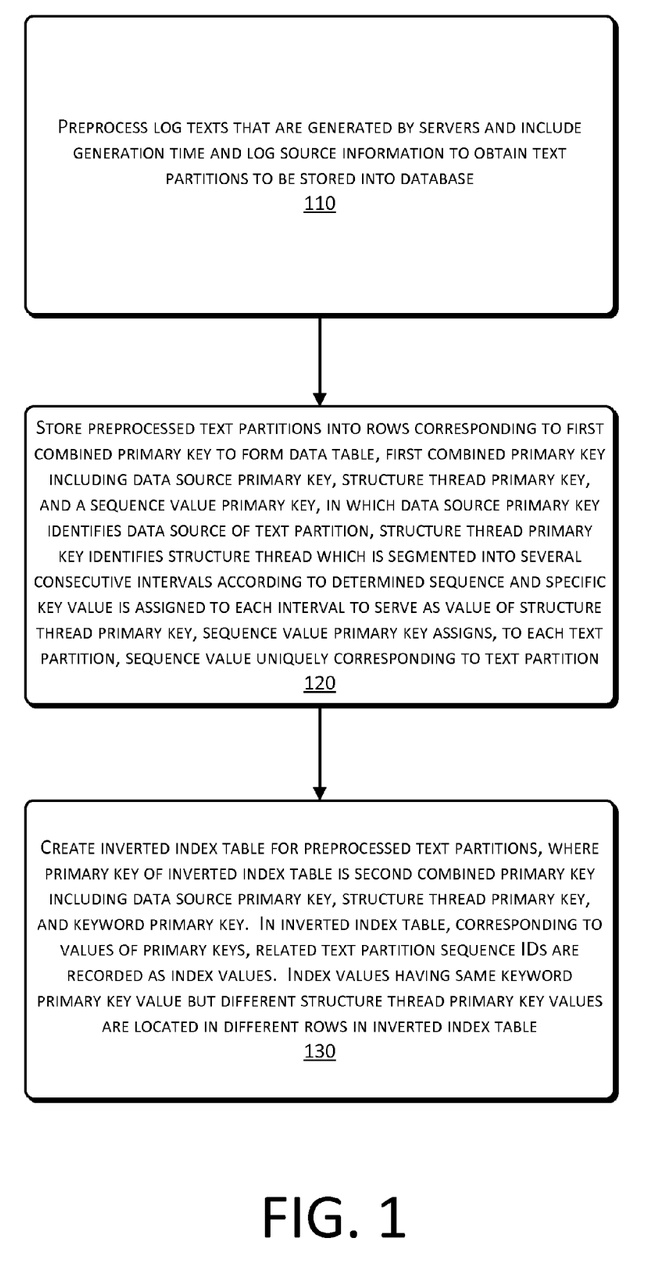
FIG. 1 is a flow chart illustrating an example NoSQL-based index creating method for semi-structured data according to the present disclosure.

Referring to FIG. 1, FIG. 1 is a flow chart illustrating an example NoSQL-based index creating method for semi-structured data according to a first example embodiment of the present disclosure. An application environment of this example embodiment is to create a NoSQL database index for logs of a website having multiple servers. With respect to a server log, a structure thread of the server log is log generation time.

This example embodiment may include the following steps:

At 110, log texts that are generated by servers and include generation time and log source information are preprocessed to obtain text partitions to be stored into a database.

Each server processes various network services continuously, and needs to generate records for these network services. These records are called logs.

The following is an instance of a log generated by a server.

10.1.168.193 - - [01/Mar/2012:16:12:07 +0800] "GET /Send?AccessKeyId=8225105404 HTTP/1.1" 200 5 "-" "Mozilla/5.0 (X11; Linux i686 on x86_64; rv: 10.0.2) Gecko/20100101 Firefox/10.0.2"

The above log text comes from a log source such as an account. This log also records time when the log is generated, i.e., [01/Mar/2012:16:12:07 +0800].

These original logs are source data. The records form of the source data are mainly designed to meet the log recording requirement of the server, but do not meet the recording requirement of a NoSQL database. Therefore, it is necessary to process the source data to obtain records that conform to a desired key-value pair form, and such processing procedure is called preprocessing. The preprocessed text partitions to be stored into the database are shown as follows.

Time: 1330589527 ip: 10.1.168.193 method:GET status: 200 length: 5 ...
Time: 1330589528 ip: 10.1.168.193 method:GET status: 500 length: 0 ...
Time: 1330589529 ip: 10.1.168.194 method:GET status: 200 length: 5 ...
......

It should be noted that the semi-structured data is a data form between structured data and completely unstructured data. The log in this example embodiment is a form of semi-structured data. The semi-structured data has at least one structure thread, and in this example embodiment, the structure thread is the log generation time. With respect to each data source, a lot of logs may be generated at a specific time point. In this case, different logs may be distinguished from each other according to subsequent Index sequence numbers.

At 120, the preprocessed text partitions in 110 are stored into rows corresponding to a first combined primary key to form a data table. The first combined primary key includes a data source primary key, a structure thread primary key, and a sequence value primary key. The data source primary key identifies a data source of a text partition. The structure thread primary key identifies a structure thread and the structure thread is segmented into several consecutive intervals according to a determined sequence. A specific key value is assigned to each interval to serve as a value of the structure thread primary key. The sequence value primary key assigns, to each text partition, a sequence value uniquely corresponding to the text partition.

The example method of creating a NoSQL database index for semi-structured data provided by this example embodiment may create two tables, where the first table is the data table for storing the preprocessed text partitions, and the second table is an inverted index table. This step is to create the data table. An example of the data table is shown as follows.

| Primary key | | | Column |
|---|---|---|---|
| Hash | Time | Sequence Number | KeyValuePairs |
| hashid | t1 | INDEX | ip: 10.1.168.193 status: 200 ... |
| hashid | t1 | INDEX + 1 | ip: 10.1.168.193 status: 500 ... |
| hashid | t1 | INDEX + 2 | ip: 10.1.168.194 status: 200 ... |

The data table is described in the following with reference to the above example.

When the data table is created, a primary key of the created data table may be determined firstly. In this example embodiment, a lot of factors need to be taken into consideration to select a primary key for the data table, and the primary key of the data table is a combined primary key. To distinguish the combined primary key herein from a combined primary key of the subsequent inverted index table, the combined primary key herein is referred to as a first combined primary key.

It is shown from the above data table that the first combined primary key includes three primary keys. A first primary key is Hash, where Hash=hash (log source information+time). A second primary key is Time, i.e., the structure thread primary key. In this example embodiment, the structure thread primary key is a time primary key. A third primary key is "a sequence number", i.e., a sequence value primary key corresponding to the text partitions.

The first primary key Hash provides a corresponding ID number for each text partition. An example method for providing the ID number is to calculate a hash value based on log source information of the text partition and time to generate a value of the first primary key. In this example embodiment, the log source information is an account that generates the log. The time is a generation time of the source data of the text partition (as the text partition has been preprocessed, to distinguish the time when the text partition is preprocessed and the time when the log represented by the text partition is generated, the latter is referred to as the generation time of the source data of the text partition). Each text partition has log source information and generation time. The log source is introduced to support multiple different applications in one data table, and these applications may share storage. During query and storage, data may be isolated from each other by identifying different log sources of the data. By adding time, logs of the same log source are made discrete so that the logs are distributed on different servers to achieve a load balance effect. The same log source may generate a lot of logs at one time point, and in this case, these logs may be further distinguished from each other by using the subsequent sequence value primary key (the "sequence number" in the table). Certainly, such case does not occur generally. In addition, by considering the generation time of the source data and performing a hush function to make the source data discrete, record locations of logs from the same account may be further distributed to different servers to obtain a hardware load balance effect. For example, if an upper limit of throughput of a data slice is 8 M/s, when a hash value calculated based on the data source and the generation time of the text partition is used as one of the primary keys, the same data source may distribute text partitions in different time periods to different data slices, and if eight slices are used, the throughput achieves 64 M/s. Therefore, by segmenting the text partitions according to the data sources and the generation time of the text partitions, the throughput of the database system may be further improved.

The second primary key is the time primary key (Time in the table), and this primary key represents the structure thread of the text partition. For example, the log generation time is not directly used as the value of this primary key; instead, a same key value is assigned to all log sources of which log generation time is in a continuous time period. For instance, all logs generated from 00:00 a.m. to 00:10 a.m. of a given day use the starting point, i.e., 00:00 a.m. of the given day, as the value of the time primary key. This method may implement batch processing for log records, and will be described in details in the subsequent process of creating the inverted index table. It should be noted that apparently the period of log generation time may also be segmented in other manners to obtain the key value, as long as the period of log generation time may be uniquely identified. For instance, an ending time point, a middle time point of this time period, or even any time point in this time period may be used. Alternatively a unique identifier may be provided in a given manner for this time period to serve as the specific key value. No matter which method is used, the method for generating values of the time key should remain consistent during the whole processing procedure to avoid confusion in value assignment.

The third primary key is the sequence value primary key corresponding to the text partition (the "sequence number" in the table). This primary key identifies the sequence number of the text partition in the data table, and according to the primary key, the position of the text partition in the data table may be found sequentially. In this example embodiment, the sequence value includes a base value (expressed as an Index in the table) which corresponds to the value of the time primary key. Based on the sequence determined by original values of the log generation time, a corresponding offset value is assigned to each text partition corresponding to a same time primary key value. Recording the sequence value of the text partition in a form of the base value plus an offset value significantly saves storage overheads as compared with recording an absolute sequence value.

At 130, an inverted index table is created for the preprocessed text partitions, where a primary key of the inverted index table is a second combined primary key and the second combined primary key includes the data source primary key, the structure thread primary key, and a keyword primary key. In the inverted index table, corresponding to values of the primary keys, related text partition sequence IDs are recorded as index values. Index values having a same keyword primary key value but different data source primary key values or different structure thread primary key values are located in different rows in the inverted index table.

The inverted index table in 130 is created based on the preprocessed text partitions in 110, and the inverted index table may also be created based on the data table created in 120. This step also needs to use generation time of the text partitions as the structure thread. A specific example of the inverted index table is shown as follows.

| Primary key | | | Column | |
| --- | --- | --- | --- | --- |
| | | | Reference sequence | |
| PartitionId | TermHash | Time | number | InverseIndex |
| partition_id | Hash(10.1.168.193) | t1 | INDEX | bit_array(0, 1) |
| partition_id | Hash(10.1.168.194) | t1 | INDEX | bit_array(2) |
| partition_id | Hash(200) | t1 | INDEX | bit_array(0, 2) |

-continued

| Primary key | | | Column | |
| --- | --- | --- | --- | --- |
| | | | Reference sequence | |
| PartitionId | TermHash | Time | number | InverseIndex |
| partition_id | Hash(500) | t1 | INDEX | bit_array(1) |
| partition_id | Hash(ip) | t1 | INDEX | bit_array(0, 1, 2) |
| partition_id | Hash(status) | t1 | INDEX | bit_array(0, 1, 2) |

As shown, the inverted index table also uses a combined primary key formed by multiple primary keys. To distinguish the combined primary key herein from the aforementioned combined primary key of the data table, the combined primary key of the inverted index table is referred to as the second combined primary key. As shown from the above inverted index table, the second combined primary key includes three primary keys, which are a first primary key or PartitionId, a second primary key or TermHash, i.e., the keyword primary key, and a third primary key Time, i.e., the time primary key, respectively.

The first primary key PartitionID=hash (log source information+keyword), where the function of this primary key is to provide an identifier for each record. This identifier is obtained by performing a hash function to obtain a hash value of (log source information+keyword). The log source is introduced to serve as the primary key so that the inverted index table supports multiple different applications and these applications may share storage. During query and storage, data may be isolated from each other by identifying different log sources. The keyword is introduced to serve as the primary key information so that inverted indexes of different terms may be evenly distributed over different machines. Same hash values calculated based on (log source information+keyword) may appear in records corresponding to different time primary key values, and in this case, these completely same PartitionIDs are distinguished according to the time primary keys.

The second primary key TermHash is a vital hash value, which may be used as a basis for searching a keyword, and is a necessary primary key of the inverted index table.

The third primary key Time, i.e., the time primary key, is the structure thread primary key. A method of setting values of this primary key may be the same as that of the time primary key of the aforementioned data table. The log generation time is not directly used as the value of the time primary key; instead, a same key value is assigned to all logs of which the log generation time is in a continuous time period. Moreover, corresponding to a same period of time, the value of the time primary key herein should be the same as the value of the time primary key of the aforementioned data table so that the two tables may be used in a matched manner.

In the above inverted index table, index values corresponding to the primary keys are recorded in two columns, which are a reference sequence number and a bit array respectively. The reference sequence number is a base value corresponding to a given value of the time primary key, where this base value should be the same as the base value that corresponds to the same time primary key value in the aforementioned data table. The bit array is a binary bit array provided for all text partitions having a same base value. In the bit array, an $i^{th}$ binary digit indicates if an $i^{th}$ text partition includes a keyword listed in the keyword primary key of a record where the $i^{th}$ text partition is located. For example, if the $i^{th}$ binary digit is set to 1, it indicates that the $i^{th}$ text partition among all text partitions having the time primary key value includes the keyword corresponding to the keyword primary key of this record. In this manner, by using the base value together with the bit array, the present techniques may determine which text partitions among all text partitions generated in this time period by the data source have the keyword corresponding to this record. Because one time key value generally corresponds to a limited number of text partitions, a given number of binary digits may be used to record if all the text partitions include a given keyword, thereby saving a large amount of space.

The above inverted index table may be interpreted as follows. If there is a need to look up for text partitions that include a given keyword with respect to a given log source in a given period of time, the log source information and time information may be used to determine a log source primary key value and a time primary key value. According to the keyword for search, a keyword primary key value is determined. In this manner, a corresponding base value and bit array are found according to the inverted index table. A sequence number of the needed text partition is obtained by combining the base value and the bit array. According to the sequence numbers, all text partitions that include the keyword are obtained from the data table corresponding to the inverted index table.

To compress the data amount of the data index records, in some special cases, the bit array in the index value may be replaced in the following methods.

When a given keyword exists in all text partitions generated by the data source in the time period, a special symbol may be set for the text partitions, where the special symbol indicates that all text partitions include the keyword. For example, the special symbol may be "ALL."

Alternatively, when a given keyword only exists in a small number of text partitions generated by the data source in the time period, text partition offset values expressed in the form of integers may be directly recorded.

The two methods described above save storage space when a keyword is distributed in an extremely dense manner or an extremely sparse manner among text partitions.

As shown in 110 to 130, the present techniques in this example embodiment create the data table by using the log generation time and text partition sequence value as primary keys, and create the inverted index table that uses the log generation time and keyword as the primary keys. Therefore, when a user performs a query according to log generation time, only the inverted index table of the related log source and related time period needs to be parsed. According to an index result provided by the inverted index table, text partition contents are obtained from the corresponding data table. Thus, the present techniques significantly improve the query efficiency. In other words, during the query, only all text partitions in the time period during which the keyword appears need to be parsed, and it is unnecessary to parse all data in the system.

Moreover, based on the data table and the inverted index table, when an inverted index needs to be created for subsequent data information, that is, during a process of updating the database index according to newly added data, the time primary key is always used as a thread. Specifically speaking, in the inverted index table, a new record may be inserted merely using the data source, the keyword, and the time period as primary keys, and it is unnecessary to read the original inverted index table, which saves time spent in reading the inverted index table. Considering the fact that reading an inverted index table with a large data amount takes more time than writing data into the inverted index table, the present techniques significantly improve the update efficiency of the database index.

If the data source and generation time of the newly added text partition are within a range of a key value identifier of a recorded data source primary key and time primary key, updating is performed to the primary key value identifier according to the keyword in the newly added text partition. If a given keyword already exists in all record ranges corresponding to the time key value, only a corresponding bit in the bit array needs to be changed. If a given keyword does not exist in any of the record ranges corresponding to the data source key value and time key value, the keyword primary key is added under the time key value.

If the database does not have key values that correspond to the data source and time yet, a time key value record corresponding to the time is created, and then, according to keywords in the text partition, records corresponding to the keywords are generated respectively.

The above method is a general method for updating data. Apparently, as to a NoSQL database index does not have a structure thread, the present techniques update the inverted index table by reading records having the same time primary key only. However, in the conventional techniques, the entire inverted index table needs to be read to update the inverted index table. Considering the fact that reading the inverted index table generally takes more time than writing data into the inverted index table, and reading time is in direct proportion to the data amount of the inverted index table, the present techniques significantly reduce time spent in updating the generated database index.

However, in an application scenario of this embodiment, a database index needs to be created for logs continuously generated during network services. Moreover, these logs surge to the database immediately after being generated, and the database index needs to be updated in real time. In such a typical application scenario, the database index is generally created once, and is not updated subsequently. For example, the database index may be created as follows.

First, the preprocessing of 110 is applied to all generated logs.

Then, all preprocessed text partitions that correspond to a same data source and are in a time period indicated by a same time primary key value are read in one time, and processing of 120 and 130 are applied. For example, a time period corresponding to a time key-value pair is 10 minutes, and all data generated by account A from 00:00 a.m. to 00:10 a.m. of a given day is read in one time after being preprocessed. A same base value is assigned to these text partitions, and an offset value is assigned to each text partition according to a reading sequence. When an inverted index table is created, keywords are segmented for these text partitions in one time, and an inverted index is created. In the inverted index table, all records have the same time key value, and the index values of the records have the same base value. In the bit array, locations of text partitions that include the keyword are set in one time. By reading all logs of one time period once, the process of creating the database index only includes a writing operation, and does not need any reading operation, thereby saving a lot of time spent in reading the inverted index table.

To conveniently describe a specific implementation process of a NoSQL-based index creating method for semi-structured data provided by the present disclosure, with reference to the aforementioned example embodiment, logs of an example nginx server (10.249.201.117) are used as an example to describe a query process which is implemented by using the created inverted index described above.

According to the inverted index table and the data table created in the above example embodiment, for example, content to be queried by a user may be that a machine with IP 10.1.168.193 reports that access to the nginx server (10.249.201.117) at time t fails and a cause of the failure is requested.

The given information is the log source, t belonging to time period t1, and a log of which the IP is 10.1.168.193 while the status is not 200. First, 10.1.168.193 is used as a keyword for search to obtain that the reference sequence number is INDEX, and the inverted index is bit_array (0, 1) (this symbol indicates that the position 0 and position 1 of the bit array are set to 1). Then, 200 is used as a keyword for search to obtain that the reference sequence number is INDEX, and the inverted index is bit_array(0, 2). According to a difference set of the two results, the reference sequence number is INDEX, and the inverted index is bit_array(1). Finally, according to the log source, the time period t1, and the sequence number INDEX+1, an original log is acquired, and the present techniques discover from the original log that the fault of SERVER 500 causes the access failure.

Example advantages of recording index values by using a bit array are described as follows.

The aforementioned database index method in which primary keys are grouped according to the log source and time may have a data expansion problem. However, the method of recording index values, in combination by using bit arrays, achieve a desirable balance between the update and query efficiency of the database index and the data scale of the database index.

Specifically speaking, when the aforementioned database is established, all text partitions having a same time primary key value and having a same log source are recorded as a long document, which is read once, and an index is created for these text partitions. All logs within this time range are indicated by using one reference sequence number Index and one bit array. If the $i^{th}$ bit is 1, it indicates that the (Index+i)$^{th}$ log includes the keyword. Therefore, the size of the inverted index recorded in this manner is only slightly more than half of the size of the original log data, and the specific effect thereof may be expressed through the following calculation. Suppose N original logs are combined into one log for indexing, the N logs have T keywords, and each keyword appears in M logs in average. The PartitionId, TermHash, and Time are 4 bytes respectively, and the INDEX is 8 bytes. In this case:

$$\frac{\text{Index size of an Index created for each log}}{\text{Index size of an Index created for } N \text{ combined logs}} =$$

$$\frac{T * M * (4+4+4+8)}{T * (4+4+4+8+N/8)} = \frac{20 * M}{20 + N/8}$$

If N=300, and M=50, the ratio is 17.4, and, as shown above, the size of the optimized index is reduced by one or two orders of magnitudes. Using data of a given day in actual observation as an example, the size of original logs processed on that day is 1.16 TB and the size of the generated index is 0.69 TB. The ratio of the index size to the log size is 0.59 and thus the database index system effectively solves the data expansion problem.

Combining multiple pieces of data information to creating an inverted index not only reduces the size of the inverted index and improves the amount of data processed by the system, but also improves the throughput of the system. The reason is that, originally, with respect to N pieces of data information, each keyword appears in M pieces of data information averagely and thus each keyword requires M times of reading and writing operations in the NoSQL database. However, if an inverted index is created after the N pieces of data information are combined into one piece of data information, for each keyword, only a new row is inserted, that is, only one writing operation needs to be performed.

The method of the bit array applies to general cases. If the keyword is distributed in a sparse or dense manner among the N pieces of data information, the storage space may be further compressed. In the case where the keyword is sparse, the inverted index information may be recorded by using an integer array, which has been described above, where each integer I in the array indicates that the (Index+I)$^{th}$ piece of data information includes the keyword. If the keyword appears in all records, a symbol ALL may be used. These methods also help reduce the data scale of the database index.

In the above example embodiment, the log generation time is used as the structure thread of the database index. In fact, there may be other structure threads. For example, if a NoSQL database index is created for all files on a hard disk, an alphabetical sequence may be used as the structure thread, and data in a given alphabetical sequence range is recorded together.

In addition, in the example embodiment, different data sources are separately recorded at different locations; however, in some cases, all data sources may be recorded together, and only the structure thread is used to provide an index thread for the database index.

Figure 2:
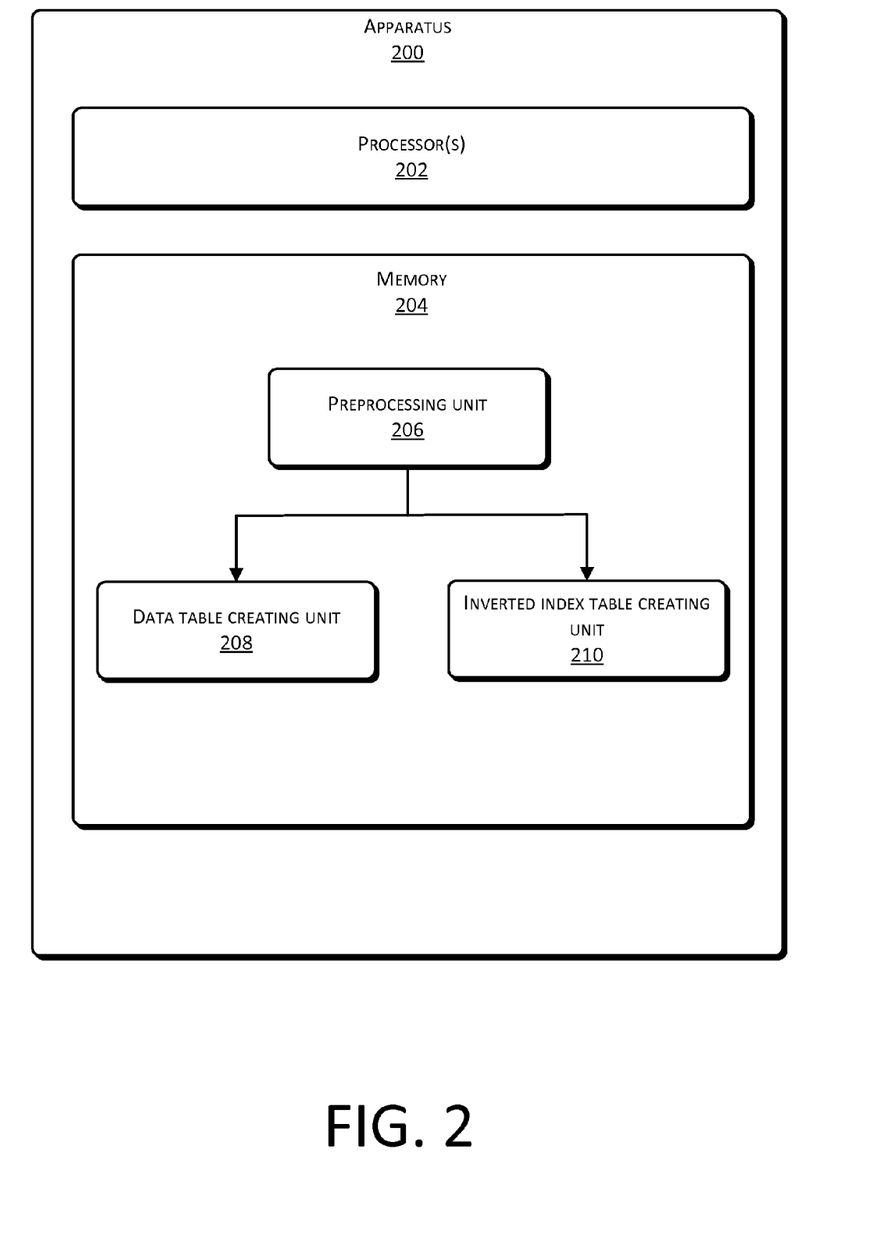
FIG. 2 is a block diagram illustrating structural units of a NoSQL-based index creating apparatus for semi-structured data according to the present disclosure.

Corresponding to the above example method embodiment of creating a NoSQL database index for semi-structured data, the present disclosure also provides an example apparatus embodiment of an apparatus of creating a NoSQL database index for semi-structured data. Referring to FIG. 2, FIG. 2 is a schematic diagram of an example apparatus 200 of creating a NoSQL database index for semi-structured data according to the present disclosure. As the example apparatus embodiment is basically similar to the example method embodiment, and the created data table and inverted index table are also substantially the same as those in the example method embodiment, the example apparatus embodiment is described in a relatively brief manner. Related portions may refer to the corresponding descriptions in the example method embodiment. The example apparatus embodiment is merely described in a schematic way in the following.

The apparatus 200 for creating NoSQL-based index for semi-structured data may include one or more processor(s) or 202 or data processing unit(s) and memory 204. The memory 204 is an example of computer-readable media. The memory 204 may store therein a plurality of modules or units including a preprocessing unit 206, a data table creating unit 208, and an inverted index table creating unit 210.

The preprocessing unit 206 preprocesses semi-structured original data to obtain several text partitions to be stored into a database. The preprocessing may represent data information content in a form of key-value pairs according to a time sequence;

The data table creating unit 208 creates a data table for storing the preprocessed text partitions. The data table has a first combined primary key, and each text partition corresponding to the first combined primary key is stored into a corresponding record. The first combined primary key includes a data source primary key, a structure thread primary key, and a sequence value primary key. The data source primary key identifies data sources of the text partitions. The structure thread primary key identifies a structure thread. The structure thread is segmented into several consecutive intervals according to a determined sequence, and a specific key value is assigned to each interval to serve as a value of the structure thread primary key. The sequence value primary key assigns, to each text partition, a sequence value uniquely corresponding to the text partition.

The inverted index table creating unit 210 creates an inverted index table for the preprocessed text partitions. A primary key of the inverted index table is a second combined primary key. The second combined primary key includes the data source primary key, the structure thread primary key, and a keyword primary key. In the inverted index table, corresponding to values of the primary keys, related text partition IDs are recorded as index values. Index values that have a same keyword primary key value but different data sources or different structure thread primary key values are located in different rows in the inverted index table.

The above description describes the example embodiments of the present disclosure, which should not be used to limit the present disclosure. One of ordinary skilled in the art may make any alterations and modifications without departing from the spirit and scope of the present disclosure. Therefore, the protection scope of the present disclosure shall be subject to the scope defined by the claims of the present disclosure.

In a standard configuration, a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but not limited to, disk, CD-ROM, or optical storage device) that include computer-executable or computer-readable instructions.

What is claimed is:

1. A method comprising:
preprocessing semi-structured source data to obtain text partitions to be stored into a database;
storing the preprocessed text partitions into a data table including a first combined primary key, the first combined primary key including a structure thread primary key and a sequence value primary key, the structure thread primary key identifying a structure thread, the structure thread being a time primary key corresponding to generation time of source data of the text partitions, the sequence value primary key assigning, to a respective text partition, a sequence value uniquely corresponding to the respective text partition;
creating an inverted index table for the preprocessed text partitions, the inverted index table including a second combined primary key, the second combined primary including the structure thread primary key and a keyword primary key, index values having a same keyword primary key value but different structure thread primary key values being located in different rows in the inverted index table; and
updating the inverted index table by reading new data from the data table, the new data having a same time primary key.

2. The method of claim 1, wherein the storing the preprocessed text partitions into the data table comprises storing a respective text partition corresponding to a respective first combined primary key into a corresponding record.

3. The method of claim 1, further comprising segmenting the structure thread into several consecutive intervals according to a predetermined sequence.

4. The method of claim 3, further comprising assigning a respective key value to a respective interval to serve as a value of a respective structure thread primary key.

5. The method of claim 3, wherein the segmenting comprising:
segmenting the generation time of the source data of the text partitions into several time periods; and
assigning a respective key value to a respective time period to serve as a value of the structure thread primary key.

6. The method of claim 5, wherein the respective key value is one of:
a starting point of the respective time period;
an ending point of the respective time period;
a middle point of the respective time period;
a point in the respective time period; or
a unique identifier determined for the respective time period.

7. The method of claim 1, further comprising recording a respective text partition sequence ID corresponding to values of primary keys in the second combined primary key as a respective index value in the inverted index table.

8. The method of claim 7, further comprising assigning a special symbol to text partitions, corresponding to a same data source primary key value and having a same structure thread primary key value, which include a respective keyword as the respective index value in the inverted index table.

9. The method of claim 7, further comprising representing the respective text partition sequence value in a form of a base value and an offset value, the base value corresponding to a value of the structure thread primary key, the offset value being assigned sequentially to the respective text partition among text partitions corresponding to a same structure thread primary key value.

10. The method of claim 9, wherein:
the first combined primary key further includes a data source primary key, the data source primary key identifying data sources of the text partitions;
the second combined primary key further includes the data source primary key, wherein index values having different data source primary key values are located in different rows in the inverted index table; and
the method further comprises:
assigning the base value for text partitions that correspond to a same data source primary key value and have a same structure thread primary key value; and
assigning a binary bit array for the text partitions that correspond to the same data source primary key value and have the same structure thread primary key value, a $i^{th}$ binary digit in the bit array indicating if a $i^{th}$ text partition including a keyword listed in the keyword primary key of a record where the $i^{th}$ text partition is located.

11. The method of claim 9, wherein:
the first combined primary key further includes a data source primary key, the data source primary key identifying data sources of the text partitions;
the second combined primary key further includes the data source primary key, wherein index values having different data source primary key values are located in different rows in the inverted index table; and
the method further comprises recording an integer to represent the offset value if one or more text partitions, corresponding to a same data source primary key value and having a same structure thread primary key value, which include a respective keyword.

12. The method of claim 1, wherein:
the first combined primary key further includes a data source primary key, the data source primary key identifying data sources of the text partitions; and
the second combined primary key further includes the data source primary key, wherein index values having different data source primary key values are located in different rows in the inverted index table.

13. The method of claim 12, further comprising, when the data table and the inverted index table are created for the text partitions, reading text partitions from a same data source and having a same structure thread primary key value in one time.

14. The method of claim 12, wherein:
in the first combined primary key, the data source primary key uses a hash value calculated based on a respective data sources of the respective text partition and an original value of the structure thread of the respective text partition; or
in the second combined primary key, the data source primary key uses a hash value calculated based on a respective data source and a respective keyword of the respective text partition.

15. An apparatus comprising:
one or more processors;
memory communicatively coupled to the one or more processors, the memory storing a plurality of units executable by the one or more processors, that when executed by the one or more processors, cause the plurality of units to perform associated operations, the plurality of units comprising:

a preprocessing unit configured to preprocess semi-structured source data to obtain text partitions to be stored into a database;
a data table creating unit configured to create a data table for storing the preprocessed text partitions, the data table including a first combined primary key, the first combined primary key including a structure thread primary key and a sequence value primary key, the structure thread primary key identifying a structure thread, the structure thread being segmented into several consecutive intervals according to a predetermined sequence, a specific key value being assigned to a respective interval to serve as a value of the structure thread primary key; a sequence value primary key assigning, to a respective text partition, a sequence value uniquely corresponding to the respective text partition; and
an inverted index table creating unit configured to create an inverted index table for the preprocessed text partitions, the inverted index table including a second combined primary key, the second combined primary key including the structure thread primary key and a keyword primary key, index values having a same keyword primary key value but different structure thread primary key values are located in different rows in the inverted index table.

16. The apparatus of claim 15, wherein:
the first combined primary key further includes a data source primary key, the data source primary key identifying data sources of the text partitions; and
the second combined primary key further includes the data source primary key, index values having different data source primary key values are located in different rows in the inverted index table.

17. The apparatus of claim 16, wherein the structure thread is generation time of source data of the text partitions.

18. The apparatus of claim 17, wherein the generation time of the source data of the text partitions is segmented into several time periods and a specific key value is assigned to a respective time period to serve as a value of the structure thread primary key.

19. One or more memories stored thereon computer-executable instructions executable by one or more processors to perform operations comprising:
preprocessing semi-structured source data to obtain text partitions to be stored into a database;
storing the preprocessed text partitions into a data table including a first combined primary key, the first combined primary key including a structure thread primary key and a sequence value primary key, the structure thread primary key identifying a structure thread, the structure thread being a time primary key corresponding to generation time of source data of the text partitions, the sequence value primary key assigning, to a respective text partition, a sequence value uniquely corresponding to the respective text partition;
creating an inverted index table for the preprocessed text partitions, the inverted index table including a second combined primary key, the second combined primary including the structure thread primary key and a keyword primary key, index values having a same keyword primary key value but different structure thread primary key values being located in different rows in the inverted index table; and
updating the inverted index table by reading new data from the data table, the new data having a same time primary key.

20. The one or more memories of claim 19, wherein the operations further comprise:
   segmenting the structure thread into several consecutive intervals according to a predetermined sequence.

* * * * *